United States Patent [19]

Ziecker et al.

[11] E Patent Number: Re. 33,481

[45] Reissued Date of Patent: Dec. 11, 1990

[54] ADHESIVE SPRAY GUN AND NOZZLE ATTACHMENT

[75] Inventors: Roger A. Ziecker, Lawrenceville; Bentley J. Boger, Atlanta; Dwayne N. Lewis, Smyrna, all of Ga.

[73] Assignee: Nordson Corporation, Amherst, Ohio

[21] Appl. No.: 345,467

[22] Filed: Apr. 28, 1989 (Under 37 CFR 1.47)

Related U.S. Patent Documents

Reissue of:

[64] Patent No.: 4,785,996
Issued: Nov. 22, 1988
Appl. No.: 41,712
Filed: Apr. 23, 1987

[51] Int. Cl.[5] ..... B05B 1/34

[52] U.S. Cl. ..... 239/298; 239/135; 239/406; 239/412; 239/417.3; 239/549; 239/600; 425/7

[58] Field of Search ..... 239/133, 135, 290, 294, 239/296, 298, 406, 411, 412, 417.3, 549, 558, 600; 425/7

[56] References Cited

U.S. PATENT DOCUMENTS

| | | | |
|---|---|---|---|
| 721,900 | 3/1903 | Lässoe et al. | 239/406 |
| 2,626,424 | 1/1953 | Hawthorne, Jr. | 65/5 |
| 3,053,461 | 9/1962 | Inglis | 239/411 |
| 3,152,923 | 10/1964 | Marshall et al. | 118/324 |
| 3,764,069 | 10/1973 | Runstadler, Jr. et al. . | |
| 3,825,379 | 7/1974 | Lohkamp et al. . | |
| 3,841,567 | 10/1974 | Drozek et al. . | |
| 4,185,981 | 1/1980 | Oshato et al. | 425/7 |
| 4,219,157 | 8/1980 | Binoche | 239/299 |
| 4,411,389 | 10/1983 | Harrison | 239/600 |

FOREIGN PATENT DOCUMENTS

| | | | |
|---|---|---|---|
| 1109198 | 8/1984 | U.S.S.R. | 239/290 |
| 1240465 | 6/1986 | U.S.S.R. | 239/290 |
| 909427 | 10/1962 | United Kingdom | 239/298 |

OTHER PUBLICATIONS

Technical Publication of Nordson Corporation, Amherst, Ohio, 1981, (Publication 43-1-11).

*Primary Examiner*—Andres Kashnikow
*Assistant Examiner*—Michael J. Forman
*Attorney, Agent, or Firm*—Wood, Herron & Evans

[57] ABSTRACT

An apparatus for spraying heated hot melt adhesive in elongated strands or fibers in a controlled, spiral pattern upon a substrate comprises a spray gun having a nozzle formed with an adhesive delivery passageway and an air delivery passageway both of which terminate at the base of the nozzle. A nozzle attachment in the form of an annular plate is mounted to the base of the nozzle by an end cap. The annular plate is formed with a throughbore which receives hot melt adhesive from the adhesive delivery passageway and ejects an adhesive bead through a nozzle tip formed on the plate. An annular groove formed in the plate facilitates the drilling of air jet bores therein at an angle relative to the throughbore and adhesive bead ejected therefrom. The air jet bores receive pressurized air from the air delivery passageway and direct the pressurized air substantially tangent to the adhesive bead to form elongated adhesive fibers and to impart a spiral motion to the elongated fibers so that they are formed in a compact spray pattern for deposition onto a substrate.

12 Claims, 2 Drawing Sheets

ADHESIVE SPRAY GUN AND NOZZLE ATTACHMENT

Matter enclosed in heavy brackets [ ] appears in the original patent but forms no part of this reissue specification; matter printed in italics indicates the additions made by reissue.

FIELD OF THE INVENTION

This invention relates to adhesive spray guns, and, more particularly, to an adhesive spray gun having a nozzle attachment for spraying hot melt adhesive in beads or fibers in a controlled spray pattern onto a substrate.

BACKGROUND OF THE INVENTION

Hot melt thermoplastic adhesives have been widely used in industry for adhering many types of products, and are particularly useful in applications where quick setting time is advantageous. One application for hot melt adhesive which as been of considerable interest in recent years is the bonding of non-woven fibrous material to a polyurethane substrate in articles such as disposable diapers, incontinence pads and similar articles.

One aspect of forming an appropriate bond between the non-woven layer and polyurethane substrate of a disposable diaper, for example, is to avoid loss of adhesive in the valley or gaps formed in the irregular surface of the chopped fibrous or fluff-type material which forms the non-woven layer. If the adhesive is discharged onto the non-woven layer in droplet form, for example, a portion of the droplets can fall between the gaps in the surface of the fibrous, non-woven material. As a result, additional quantities of adhesive are required to obtain the desired bond strength between the polyurethane substrate and non-woven material.

This problem has been overcome in the prior art by forming hot melt thermoplastic adhesives in elongated, thin beads or fibers which are deposited atop the non-woven material and span the gaps in its irregular surface. Elongated beads or fibers of adhesive have been produced in prior art spray devices which include a nozzle formed with an adhesive discharge opening and one or more air jet orifices through which a jet of air is ejected. A bead of adhesive is ejected from the adhesive discharge opening in the nozzle which is then impinged by the air jets to attenuate or stretch the adhesive bead forming a thin fiber for deposition onto the substrate. Examples of spray devices of this type are disclosed in U.S. Pat. Nos. 2,626,424 to Hawthorne, Jr.; 3,152,923 to Marshall et al; and, 4,185,981 to Ohsato et al.

In applications such as the formation of disposable diapers, it is important to carefully control the spray pattern of adhesive fibers deposited onto the non-woven substrate in order to obtain the desired bond strength between the non-woven layer and polyurethane substrates using as little adhesive as possible. Improved control of the spray pattern of adhesive fibers have been obtained in prior art spray devices of the type described above by impacting the adhesive bead discharged from the nozzle with air jets directed substantially tangent to the adhesive bead. The tangentially applied air jets control the motion of the elongated fibers of adhesive formed from the adhesive bead ejected from the adhesive discharge opening in the gun nozzle, and confine the elongated fibers in a relatively tight, or compact, spiral pattern for application onto the substrate. Structure which produces a spiral spray pattern of adhesive fibers for deposition onto a substrate is disclosed, for example, in Hawthorne, Jr. U.S. Pat. No. 2,626,424 and Ohsato et al U.S. Pat. No. 3,152,923 mentioned above.

In order to produce a compact spiral spray pattern of adhesive fibers in the spray devices described above, it is important to ensure that the air jets are accurately directed tangent to the bead of adhesive ejected from the nozzle of the spray device. This requires accurate placement of the bores or passageways through which pressurized air is ejected to form the air jets in the nozzle or gun body of the spray device, which are typically on the order of about 0.015 to 0.020 inches in diameter. Boring or drilling of bores or passageways of this small size at the appropriate angles in the nozzle and/or gun body of prior art spray devices is a relatively expensive and difficult machining operation.

Another problem with prior art spray devices for spraying adhesive fibers is that they are not readily convertible from an adhesive bead of one diameter to a bead of another diameter. In order to change the diameter of the adhesive bead for a given application, the location of the spray jets must also be adjusted so that they remain tangent to the adhesive bead. This can require substantial modification of prior art spray devices, adding to their expense.

SUMMARY OF THE INVENTION

It is therefore among the objectives of this invention to provide a nozzle attachment for use in a spray gun for spraying hot melt adhesive in elongated beads or fibers onto a substrate which is relatively inexpensive to manufacture, which provides accurately located air jets to attenuate or stretch an adhesive bead to form adhesive fibers and which is readily installed on a standard spray gun to convert the spray gun to one capable of spraying hot melt adhesive in fiber form.

These objectives are accomplished in a nozzle attachment for an apparatus for spraying hot melt adhesive which includes a gun body having a nozzle formed with an adhesive discharge opening connected to an adhesive passageway in the gun body which communicates with a source of heated hot melt adhesive, and an air discharge opening connected to an air passageway in the gun body which communicates with a source of pressurized air. The nozzle attachment is a one-piece annular plate which is mounted by a cap to the nozzle of the gun body. The nozzle attachment or plate is formed with a throughbore adapted to connect to the adhesive discharge opening in the nozzle, and a plurality of spaced air jet bores are formed in the plate which communicate with the air discharge opening of the nozzle. An adhesive bead is ejected from the throughbore in the plate which is impacted by air jets from the spaced air jet bores. The air jets are directed tangentially to the bead to both stretch the bead to form hot melt adhesive fibers, and to impart a spiral motion to the fibers so that they are deposited in a controlled spray patter upon a substrate.

More specifically, in a presently preferred embodiment, the one-piece annular plate is formed with a a boss extending outwardly from a first surface of the plate and a nozzle tip extending outwardly from a second surface of the plate. A throughbore is formed between the boss and the nozzle tip which communicates with the adhesive discharge opening in the nozzle of the gun body when the plate is mounted to the nozzle. Heated hot melt adhesive is transmitted through the adhesive passageway in the gun body, out its adhesive discharge opening and then into the throughbore in the plate from which it is ejected through the nozzle tip toward a substrate.

An important feature of the construction of the annular plate forming the nozzle attachment herein is the presence of an annular, V-shaped notch or groove in the plate which extends from the first surface having the boss inwardly toward the second surface having the nozzle tip. The V-shaped groove is provided to assist in the drilling operation of the air jet bores through which the jets of pressurized air are directed into contact with the adhesive bead ejected from the throughbore in the plate.

Preferably, each of the spaced air jet bores is drilled at an angle of approximately 30° with respect to the longitudinal axis of the throughbore. In order to assist in drilling the air jet bores at this angle, the annular groove is formed with two sidewalls, one of which is disposed substantially perpendicularly to the longitudinal axis of each of the air jet bores. This construction permits the drill bit to contact the plate at the surface of one of the sidewalls in the annular groove which is substantially perpendicular to the axis of movement of the drill bit. As a result, sliding of the plate relative to the drill bit is minimized during the drilling or boring operation which ensures that the air jet bores are located at the desired angle in the plate.

In a presently preferred embodiment, the spaced air jet bores extending from the annular groove toward the second surface of the plate are also formed at an angle relative to the outer periphery of the throughbore and the adhesive bead ejected therefrom. The longitudinal axis of each air jet bore is approximately 10° with respect to a vertical plane which passes through the longitudinal axis of the throughbore in the plate and the center of such air jet bore at the V-shaped groove in the plate. As a result, the jets of pressurized air ejected from the spaced air jet bores impact the adhesive bead discharged from the nozzle tip of the plate at its outer periphery so as to impart a rotational movement to the bead. The adhesive bead is attenuated or stretched into elongated fibers upon impact with the air jets, and these fibers are then rotated by the air jets in a spiral motion to control the width of the spray pattern applied to the substrate.

The nozzle attachment or plate of this invention provides an economical means to convert a standard spray gun into one in which hot melt adhesive may be discharged in elongated strands or fibers for applications such as bonding the non-woven and polyurethane layers of disposable diapers or other hygienic articles. The annular groove formed in the plate facilitates accurate drilling of the air jet bores so that the adhesive bead discharged from the spray device is consistently formed into elongated fibers which are then rotated in a spiral motion to form a compact, controlled spray pattern upon the substrate. The nozzle attachment or plate is easily removed from the spray gun and replaced with another nozzle attachment of different size to accommodate different applications.

DETAILED DESCRIPTION OF THE DRAWINGS

The structure, operation and advantages of the presently preferred embodiment of this invention will become further apparent upon consideration of the following description taken in conjunction with the accompanying drawings, wherein.

DETAILED DESCRIPTION OF THE INVENTION

Figure 1:
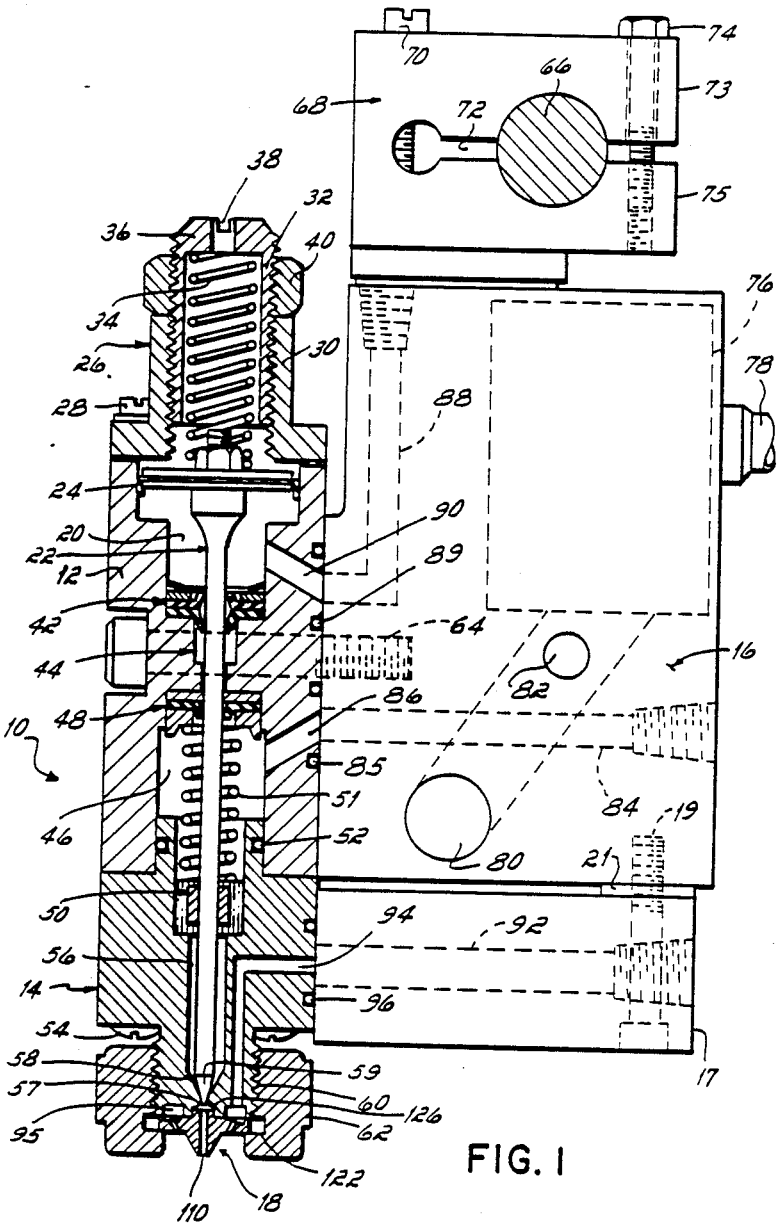
FIG. 1 is a cross sectional view of a spray gun incorporating the nozzle attachment herein with a schematic view of a manifold mounted to the spray gun.

Referring now to FIG. 1, an adhesive spray device 10 is illustrated comprising a gun body 12 having a nozzle 14 connected at one end, and an adhesive manifold 16 and air manifold 17 mounted to the gun body 12. The air manifold 17 is mounted to the adhesive manifold 16 by two or more screws 19, each of which extend through a spacer 21 extending between the manifolds 16, 17. The nozzle 14 supports a nozzle attachment 18 from which a bead of heated hot melt adhesive is discharged and formed into a thin, elongated bead or fiber which is rotated in a compact spiral spray pattern onto a substrate, as discussed in detail below. The structure of the gun body 12 and manifolds 16, 17 are substantially identical to the Model H200 spray gun manufactured and sold by the assignee of this invention, Nordson Corporation of Amherst, Ohio. These elements form no part of the invention per se and are thus discussed only briefly herein.

As shown in FIG. 1, the upper portion of gun body 12 is formed with an air cavity 20 which receives the upper end of a plunger 22 mounted to a seal 24. The seal 24 is slidable within the air cavity 20 and provides an airtight seal along its walls. A collar 26 is mounted to the upper end of gun body 12, such as by bolts 28, which is formed with a throughbore defining an inner, threaded wall 30. The collar 26 receives a plug 32 having external threads which mate with the threaded wall 30 of the collar 26. The plug 32 is hollow and a spring 34 is mounted in its interior which extends between the top end of the plunger 22 and the head 36 of plug 32 having a screw slot 38. A lock nut 40 is threaded onto the plug 32 into engagement with the top edge of the collar 26.

The plug 32 is rotatable with respect to the collar 26 to vary the force applied by the spring 34 against the top edge of plunger 22. In order to rotate the plug 32, the lock nut 40 is first rotated to disengage the collar 26 after which a screwdriver is inserted into the screw slot 38 in the head 36 of plug 32 and rotated to move the plug 32, and in turn increase or decrease the compression force of spring 34 within the collar 26.

The plunger 22 is sealed at the base of the air cavity 20 by a seal 42 which permits axial movement of the plunger 22 therealong. The plunger 22 extends downwardly through the gun body 12 from the air cavity 20 through a stepped bore 44 which leads into an adhesive cavity 46 having a seal 48 at its upper end and a plunger mount 50 at its lower end. A return spring 51 mounted to the plunger 22 is disposed within the adhesive cavity 46 and extends between the seal 48 and plunger mount 50. Both the narrow portion of the stepped bore 44 and the plunger mount 50 aid in guiding the axial movement of plunger 22 within the gun body 12.

The upper end of the nozzle 14 extends into the adhesive cavity 46 and is sealed thereto by an O-ring 52. The nozzle 14 is fixed to the gun body 12 by screws 54. The plunger 22 extends downwardly from the adhesive cavity 46 and plunger mount 50 into an adhesive passageway 56 formed in the nozzle 14 which terminates at an adhesive discharge opening 57. Immediately upstream from the adhesive discharge opening 57, the adhesive passageway 56 is formed with a conical-shaped seat 58 which mates with the terminal end 59 of the plunger 22. As discussed below, movement of the plunger 22 relative to the seat 58 controls the flow of heated hot melt adhesive ejected from adhesive passageway 56 through its adhesive discharge opening 57.

The nozzle 14 is also formed with a reduced diameter portion having external threads 60 which mate with internal threads formed in a cap 62. As described below, the cap 62 mounts the nozzle attachment 18 to the base of nozzle 14 in communication with the discharge opening 57 of adhesive passageway 56.

The gun body 12 is mounted to the adhesive manifold 16 by mounting bolts 64. In turn, the adhesive manifold 16 is supported on a bar 66 by a mounting block 68 connected to the adhesive manifold 16 with screws 70. As illustrated at the top of FIG. 1, the mounting block 68 is formed with a slot 72 forming two half sections 73, 75 which receive the bar 66 therebetween. A bolt 74 spans the half sections 73, 75 of the mounting block formed by the slot 72 and tightens them down against the bar 66 to secure the mounting block 68 thereto.

The adhesive manifold 16 is formed with a junction box 76 which receives an electric cable 78 to supply power to a heater 80 and an RTD 82. The heater 80 maintains the hot melt adhesive in a molten state when it is introduced into the adhesive manifold 16 through an adhesive inlet line 84 from a source of hot melt adhesive (not shown). The adhesive inlet line 84 communicates through a connector line 86 formed in the gun body 12 with the adhesive cavity 46. An O-ring 85 is provided between the gun body 12 and adhesive manifold 16 at the junction of the adhesive inlet line 84 and connector line 86 to form a seal therebetween. Operating air for the plunger 22 is supplied through an inlet line 88 formed in the adhesive manifold 16 which is joined by a connector line 90 to the air cavity 20. The gun body 12 and manifold are sealed thereat by an O-ring 89.

The air manifold 17 is formed with an air inlet line 92 connected to an air delivery passageway 94 formed in the nozzle 14 which terminates in an annular chamber 95 at the base of the nozzle 14. O-ring seal 96 forms a fluid-tight seal between the nozzle 14 and air manifold 17 at the intersection of air inlet line 92 and air delivery passageway 94.

Figure 2:
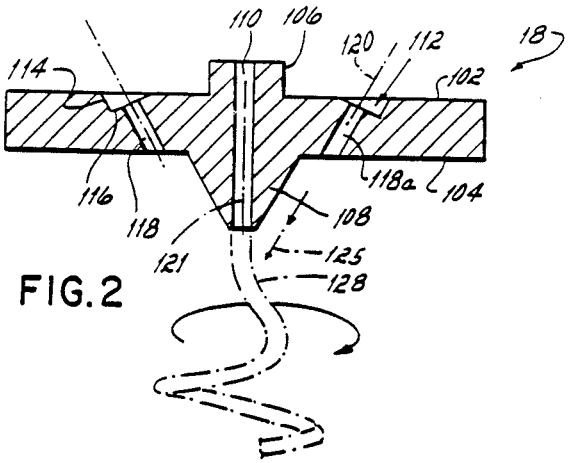
FIG. 2 is an enlarged cross sectional view of the nozzle attachment herein showing an adhesive bead impacted by air jet streams.
Figure 3:
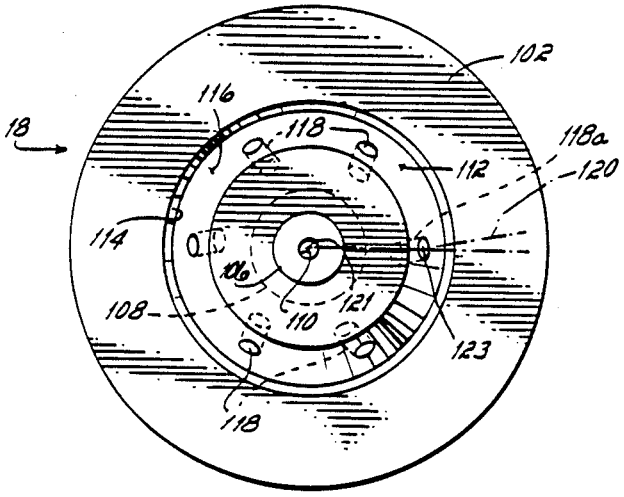
FIG. 3 is a top plan view of the nozzle attachment shown in FIG. 2.

Referring now to the bottom of FIG. 1 and to FIGS. 2 and 3, the nozzle attachment 18 of this invention is shown in detail. The nozzle attachment 18 is an annular plate having one side formed with a first or upper surface 102 and an opposite side formed with a second or lower surface 104 spaced from the upper surface 102. A boss 106 extends outwardly from the upper surface 102 and a nozzle tip 108 extends outwardly from the lower surface 104 in alignment with the boss 106. A throughbore 110 is formed in the nozzle attachment 18 between the boss 106 and nozzle tip 108. The throughbore 110 has a diameter in the range of about 0.010 to 0.040 inches, and preferably in the range of about 0.0175 to 0.0185 inches.

An annular, V-shaped groove 112 is formed in the nozzle attachment 18 which extends inwardly from its upper surface 102 toward the lower surface 104. The annular groove 112 defines a pair of sidewalls 114, 116 which are substantially perpendicular to one another. In a presently preferred embodiment, the sidewall 116 is formed at approximately a 30° angle with respect to the planar upper surface 102 of the nozzle attachment 18. As best shown in FIGS. 2 and 3, six air jet bores 118 are formed in the nozzle attachment 18 between the annular groove 112 and the lower surface 104, preferably at an angle of approximately 30° with respect to the longitudinal axis of the throughbore 110. The diameter of the air jet bores 118 are in the range of about 0.010 to 0.040 inches, and preferably in the range of about 0.017 to 0.019 inches.

The annular groove 112 facilitates accurate drilling of the air jet bores 118 so that they are disposed at the desired angle relative to throughbore 110. By forming the sidewall 116 at a 30° angle relative to the upper surface 102 of nozzle attachment 18, a drill bit (not shown) can enter the annular groove 112 in the nozzle attachment 18 at a 30° angle relative to its upper surface 102, but contact the sidewall 116 formed in the annular groove 112 at a 90° angle. As a result, the drilling operation is performed with minimal slippage between the drill bit and nozzle attachment 18 to ensure the formation of accurately positioned air jet bores 118.

As shown in FIG. 3, the longitudinal axis of each of the air jet bores 118 is angled approximately 10° with respect to a vertical plane passing through the longitudinal axis of the throughbore 110 and the center of each such bore 118 at the annular groove 112. For example, the longitudinal axis 120 of air jet bore 118a is angled approximately 10° relative to a vertical plane passing through the longitudinal axis 121 of throughbore 110 and the center point 123 of bore 118a at the annular groove 112 in nozzle attachment 18. As a result, the jet of pressurized air 125 ejected from air jet bore 118a is directed substantially tangent to the outer periphery of the throughbore 110 and the adhesive bead ejected therefrom, as described below.

Referring now to FIG. 1, the cap 62 is formed with an annular seat 122 which receives the nozzle attachment 18. The cap 62 is threaded onto the lowermost end of the nozzle 14 so that the boss 106 on the upper surface 102 of nozzle attachment 18 extends within a seat 126 formed in the base of nozzle 14 at the adhesive discharge opening 57 of adhesive passageway 56. With the nozzle attachment 18 in this position, the annular groove 112 communicates with the annular air chamber 94 formed in the base of the nozzle 14 at the end of the air delivery passageway 94. No O-rings or other seals are required between the upper surface 102 of the nozzle attachment 18 and the nozzle 14 in order to create a fluid-tight seal between the boss 106 and adhesive discharge opening 57 and a fluid-tight seal at the juncture of the annular groove 112 and air chamber 95. The nozzle attachment 18 is easily removed and replaced by another attachment of different size by rotating the cap 62 out of engagement with the nozzle 14.

The operation of the spray device 10 of this invention is as follows. Heated hot melt adhesive is introduced into the adhesive cavity 46 of the gun body 12 through the adhesive inlet line 84. Adhesive flows from the adhesive cavity 46 into the nozzle 14 through the adhesive passageway 56. With the terminal end 59 of the plunger 22 in engagement with the seat 58 formed at the end of the adhesive passageway 56, as illustrated in FIG. 1, the adhesive is not permitted to flow through the adhesive discharge opening 57 of the adhesive passageway 56 to the throughbore 110. In order to retract the plunger 22 and permit the flow of adhesive into the discharge opening 57, operating air is introduced through the operating air line 88 into the air cavity 20 in the gun body 12. This pressurized air acts against the seal 24 connected to the plunger 22 which forces the plunger 22 upwardly so that its terminal end 59 disengages the seat 58 at the lower end of the adhesive passageway 56. The plunger 22 is returned to its closed position by discontinuing the flow of air to the air cavity 20 allowing the return spring 34 to move the plunger 22 back into a seated position.

The flow of hot melt adhesive through the adhesive discharge opening 57 of adhesive passageway 56 is transmitted into the throughbore 110 of nozzle attachment 18 from which it is discharged through the nozzle tip 108 to form an adhesive bead 128. At the same time the adhesive bead 128 is formed and ejected from the nozzle attachment 18, pressurized air is directed through the air inlet line 92, air delivery passageway 94 and air chamber 95 to the air jet bores 118 formed in the nozzle attachment 18.

As best shown in FIG. 2, the air jet bores 118 are angled relative to the longitudinal axis of the throughbore 110 so that the jets of air flowing therethrough impact the adhesive bead 128 substantially tangent to its outer periphery at a point spaced below the nozzle tip 108. The air ejected from the air jet bores 118 performs two functions. First, the jets of air attenuate or stretch the adhesive bead 128 forming elongated strands or fibers of hot melt adhesive for deposit onto a substrate. Additionally, since the air jet bores 118 are oriented to directed jets of air tangent to the outer periphery of the adhesive bead 128, the adhesive bead 128 and adhesive fibers formed therefrom are rotated in a compact spiral path toward a substrate. As a result, a controlled pattern of adhesive having a desired width is obtained on the substrate.

While the invention has been described with reference to a preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A nozzle attachment for use in an apparatus for spraying hot melt adhesive which includes a gun body having a nozzle formed with an adhesive passageway for conveying heated hot melt adhesive and an air delivery passageway for conveying pressurized air, said nozzle attachment comprising:

a one-piece annular plate formed with a first surface on one side of said plate, and a second surface on an opposite side of said plate having a nozzle tip extending outwardly therefrom;

said plate being formed with a throughbore extending between said one side and said nozzle tip, said plate being adapted to mount to said nozzle of said gun body so that said throughbore communicates with said adhesive passageway in said nozzle for receiving heated hot melt adhesive, the hot melt adhesive being ejected from said nozzle tip in said annular plate to form an adhesive bead;

said plate being formed with a substantially V-shaped annular groove forming first and second sidewalls each extending inwardly from said first surface toward said second surface and intersecting one another, said annular groove being adapted to communicate with said air delivery passageway in said nozzle of said gun body;

said plate being formed with a plurality of bores extending from said annular groove in communication with said air delivery passageway to said second surface for transmitting air therethrough, said bores each having a longitudinal axis extending substantially perpendicular to one of said first and second sidewalls of said V-shaped annular groove, said bores being formed at an angle with respect to said throughbore in said plate to direct pressurized air flowing therethrough substantially tangent to the outer periphery of said adhesive bead ejected from said nozzle tip to form said adhesive bead in elongated adhesive fibers and to impart a twisting motion to said elongated adhesive fibers to form a spiral spray pattern of elongated adhesive fibers for deposition on a substrate.

2. The nozzle attachment of claim 1 in which said bores in said plate are formed at an angle of about 30° relative to the longitudinal axis of said throughbore in said plate.

3. The nozzle attachment of claim 1 in which the longitudinal axis of each said bores forms an angle of approximately 10° relative to a vertical plane passing through the longitudinal axis of said throughbore, the pressurized air ejected from said bores thereby being directed through said bores substantially tangent to the outer periphery of said adhesive bead ejected from said nozzle tip.

4. The nozzle attachment of claim 1 in which the diameter of said throughbore and the diameter of said air jet bores are in the range of about 0.010 to 0.040 inches.

5. The nozzle attachment of claim 1 in which the diameter of said throughbore is in the range of about 0.0175 to 0.0185 inches, and the diameter of said air jet bores is in the range of about 0.017 to 0.019 inches.

6. Apparatus for spraying hot melt adhesive, comprising:

a gun body having a nozzle formed with an adhesive passageway communicating with a source of heated hot melt adhesive and terminating in an adhesive discharge opening, said nozzle being formed with an air passageway communicating with a source of pressurized air and terminating in an air chamber;

a one-piece annular plate formed with a boss extending outwardly from a first surface of said plate and a nozzle tip extending outwardly from a second surface of said plate, said plate being formed with a throughbore extending between said boss and said nozzle tip;

said plate being formed with a substantially V-shaped annular groove forming first and second sidewalls each extending inwardly from said first surface toward said second surface thereof, and a plurality of air jet bores extending between said annular groove and said second surface at an angle relative to said throughbore, said air jet bores each having a longitudinal axis substantially perpendicular to one of said first and second sidewalls of said V-shaped annular groove;

cap means for mounting said plate to said nozzle of said gun body so that said throughbore formed between said boss and said nozzle tip communicates and said annular groove and spaced air jet bores communicate with said air chamber in said nozzle, said throughbore receiving heated hot melt adhesive from said adhesive discharge opening and ejecting the heated hot melt adhesive through said nozzle tip to form an adhesive bead, said air jet bores receiving pressurized air from said air chamber and directing the pressurized air substantially tangent to the outer periphery of said adhesive bead to form elongated adhesive fibers and to impart a twisting motion to said elongated adhesive fibers to form a spiral spray pattern of elongated adhesive fibers for deposition on a substrate.

7. The apparatus of claim 6 in which said nozzle of said gun body is formed with a seat which receives said boss of said plate forming a fluid-tight seal therebetween.

8. The apparatus of claim 6 in which a portion of said nozzle of said gun body is formed with external threads, said cap means comprising a cylindrical-shaped member formed with a throughbore defining an inner wall having threads adapted to mate with said external threads of said nozzle, said cylindrical-shaped member being formed with an annular seat which receives and supports said plate, said cylindrical-shaped member being threaded onto said nozzle to place said throughbore of said plate in communication with said adhesive discharge opening in said nozzle.

*9. A nozzle attachment for use in an apparatus for spraying hot melt adhesive which includes a gun body having a nozzle formed with an adhesive passageway for conveying heated hot melt adhesive and an air delivery passageway for conveying pressurized air, said nozzle attachment comprising:*

*a one piece annular plate formed with a first surface on one side of said plate, and a second surface on an opposite side of said plate having a nozzle tip extending outwardly therefrom;*

*said plate being formed with a throughbore extending from said first surface through said nozzle tip, said throughbore having an axis, means mounting said plate to said gun of said gun body so that said throughbore communicates with said adhesive passageway in said nozzle for receiving heated hot melt adhesive, the hot melt adhesive being ejected from said nozzle tip in said annular plate to form an adhesive bead;*

*said plate being formed with an annular surface, said annular surface sloping relative to the axis of said throughbore;*

*said plate being formed with a plurality of bores extending from said annular surface through said plate, said bores being in communication with said air delivery passageway;*

*each of said bores having a longitudinal axis extending substantially perpendicular to said annular surface, said bores being formed at an angle with respect to said throughbore in said plate to direct pressurized air flowing therethrough substantially tangent to the outer periphery of said adhesive bead ejected from said nozzle tip to form said adhesive bead into elongated adhesive fibers and to impart a twisting motion to said elongated adhesive fibers to form a spiral spray pattern of elongated adhesive fibers for deposition on a substrate.*

*10. The adhesive attachment of claim 9 in which said annular surface is of frusto conical configuration.*

*11. The adhesive attachment of claim 9 in which said annular surface forms one wall of a groove.*

*12. The adhesive attachment of claim 9 in which said plate configuration provides unobstructed access to said annular surface whereby a drill bit can engage said annular surface at substantially a right angle to said surface.*

* * * * *